United States Patent
Bockelkamp et al.

(10) Patent No.: US 9,759,770 B2
(45) Date of Patent: Sep. 12, 2017

(54) ARRANGEMENT FOR PARTIAL RELEASE OF A DEBUGGING INTERFACE

(71) Applicant: dSPACE digital signal processing and control engineering GmbH, Paderborn (DE)

(72) Inventors: Matthias Bockelkamp, Paderborn (DE); Marc Dressler, Horn-Bad Meinberg (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 51 days.

(21) Appl. No.: 14/804,500

(22) Filed: Jul. 21, 2015

(65) Prior Publication Data

US 2016/0018464 A1    Jan. 21, 2016

(30) Foreign Application Priority Data

Jul. 21, 2014   (DE) .................. 10 2014 110 197
Jul. 3, 2015    (DE) .................. 10 2015 110 729

(51) Int. Cl.
   *G06F 11/00*      (2006.01)
   *G01R 31/3177*    (2006.01)
   (Continued)

(52) U.S. Cl.
   CPC ...... *G01R 31/3177* (2013.01); *G06F 11/3648* (2013.01); *G06F 11/3652* (2013.01); *G06F 11/3656* (2013.01); *G06F 21/575* (2013.01)

(58) Field of Classification Search
   CPC ............. G06F 11/3648; G06F 11/3652; G06F 11/3656
   See application file for complete search history.

(56) References Cited

U.S. PATENT DOCUMENTS 6,769,065 B2   7/2004  Mayer
6,910,127 B1   6/2005  Player
(Continued)

FOREIGN PATENT DOCUMENTS

CN        1815628 A      8/2006
DE     2010/0192015      7/2010
(Continued)

OTHER PUBLICATIONS

German Search Report for German Application No. 102015110729.5 dated Jun. 15, 2016 with English translation.
(Continued)

*Primary Examiner* — Charles Ehne
(74) *Attorney, Agent, or Firm* — Muncy, Geissler, Olds & Lowe, P.C.

(57) ABSTRACT

An arrangement for the partial release of a debug interface of a programmable hardware component, whereby a first logic for the programmable hardware component can be stored in a configuration memory and a configuration device is designed to program the programmable hardware component via a configuration interface of the programmable hardware component according to the first logic. The configuration device is further designed to register a programming process of the programmable hardware component which occurs via the debug interface according to a second logic and, upon termination of the programming process occurring via the debug interface, reprograms the programmable hardware component according to the first logic.

18 Claims, 1 Drawing Sheet

(51) Int. Cl.
*G06F 11/36* (2006.01)
*G06F 21/57* (2013.01)

(56) References Cited

U.S. PATENT DOCUMENTS

| | | | |
|---|---|---|---|
| 7,149,636 B2* | 12/2006 | Cyran | G06F 11/3024 702/122 |
| 7,971,051 B2 | 6/2011 | Paul et al. | |
| 8,686,753 B1 | 4/2014 | Herrmann et al. | |
| 8,966,313 B2* | 2/2015 | Truong | G06F 11/3656 714/30 |
| 2004/0113655 A1 | 6/2004 | Curd et al. | |
| 2006/0119384 A1 | 6/2006 | Camarota et al. | |
| 2010/0192015 A1 | 7/2010 | Dressler et al. | |
| 2010/0199077 A1 | 8/2010 | Case et al. | |
| 2011/0145934 A1 | 6/2011 | Abramovici et al. | |
| 2013/0290785 A1* | 10/2013 | Truong | G06F 11/3656 714/30 |

FOREIGN PATENT DOCUMENTS

| | | |
|---|---|---|
| EP | 2 608 102 A1 | 6/2013 |
| JP | H 03-205690 A | 9/1991 |

OTHER PUBLICATIONS

Das et al., "Secure JTAG Implementation using Schnorr Protocol," J. of Electronic Testing, vol. 29, No. 2, pp. 193-209 (2013).
Extended European Search Report for European Application No. 15177297.7 dated Nov. 26, 2015 with English translation.
Park et al., "JTAG Security System Based on Credentials," J. of Electronic Testing, Theory and Applications, vol. 26, No. 5, pp. 549-557 (Sep. 1, 2010).
Pierce et al., "Multi-Level Secure JTAG Architecture," IEEE 17th Int'l On-Line Testing Symposium (IOLTS), pp. 208-209 (Jul. 13, 2011).
U.S. Appl. No. 14/804,692, filed Jul. 21, 2015.
Chinese Office Action for Chinese Application No. 201510680947.6 dated Jun. 23, 2017 with English translation.

* cited by examiner

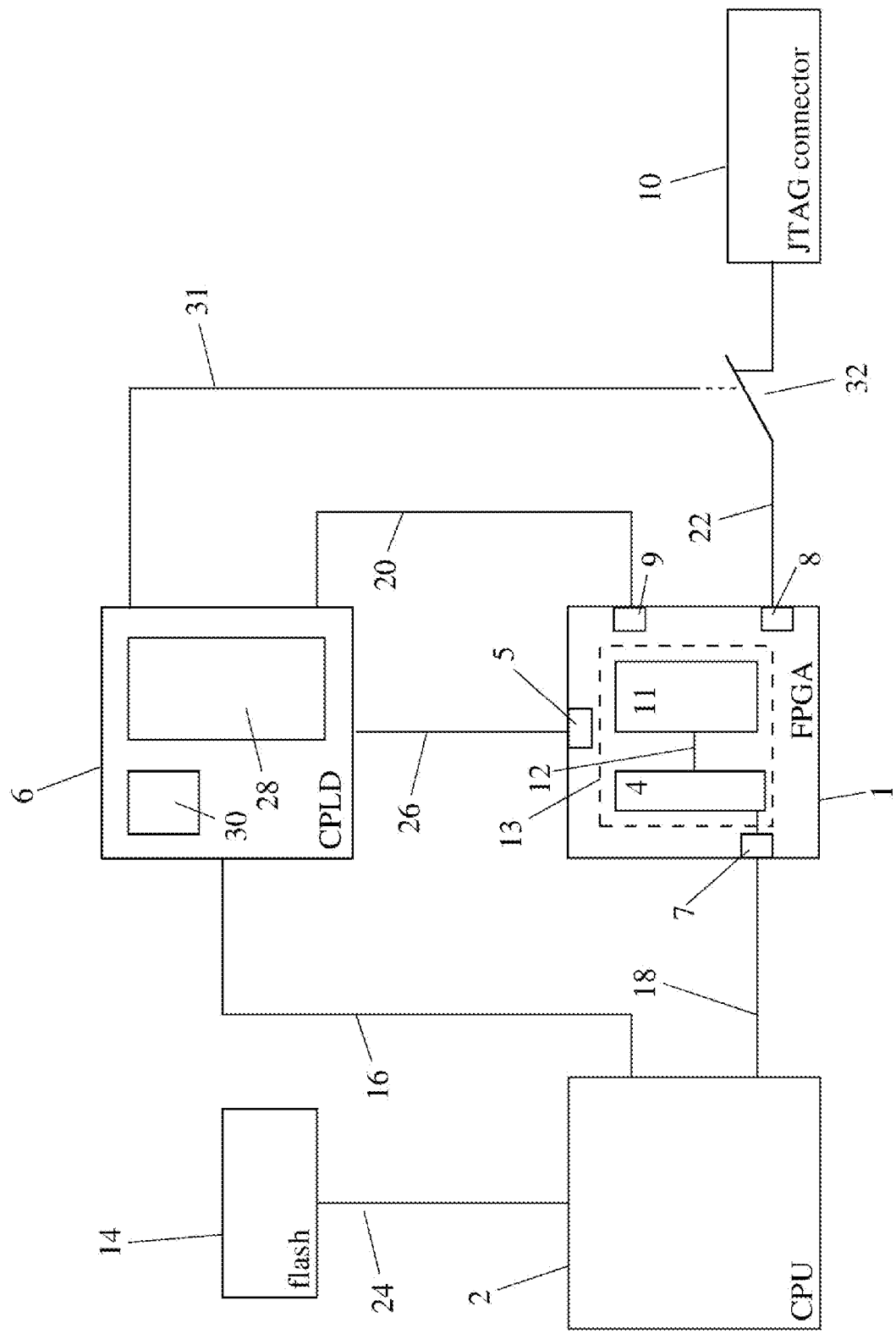

ARRANGEMENT FOR PARTIAL RELEASE OF A DEBUGGING INTERFACE

This nonprovisional application claims priority under 35 U.S.C. §119(a) to German Patent Application No. 10 2014 110 197.9, filed on Jul. 21, 2014, and German Patent Application No. 10 2015 110 729.5, filed on Jul. 3, 2015, both of which are herein incorporated by reference.

BACKGROUND OF THE INVENTION

Field of the Invention

The invention relates to an arrangement for the partial release of a debug interface of a programmable hardware component.

Description of the Background Art

In addition to a dedicated configuration interface for the programming of the hardware component, programmable hardware components such as processors, FPGAs and CPLDs often feature a debug interface which is mainly provided for the debugging of the logic programmed on the hardware interface. Just like the configuration interface, this logic is also suitable for programming the hardware component.

In some application scenarios, the option of programming the hardware component via the debug interface can be problematic, for example, if a second programmable hardware component is linked to the configuration interface of a first programmable hardware component in such a way that the first programmable hardware component is programmable by a user via a second programmable hardware component, whereby the second programmable hardware component only partially allows the user freedom for programming the first programmable hardware component. This can occur, for example, in such a way that the second programmable hardware component programs an obligatory interface logic on the first programmable hardware component in addition to the logic programmed by the user, which supplies logical mechanisms for the data exchange with the hardware environment of the first programmable hardware component and prevents the user from damaging the first programmable hardware component or its hardware environment through faulty programming. In this case, the complete release of the debug interface of the first programmable hardware component allows the user to program a logic on the first programmable hardware component without the provided safety logic.

The patent specification U.S. Pat. No. 7,971,051 describes an arrangement for the automatic reprogramming of an FPGA via the monitoring of a signal emitted by the FPGA when programming of the FPGA is faulty or inadmissible.

SUMMARY OF THE INVENTION

It is therefore an object of the invention to provide a technical arrangement for the partial release of a debug interface of a programmable hardware component which does not release the debug interface for programming the hardware component and does release the debug interface for other applications, particularly for the debugging of the programmed logic located on the hardware component.

In an exemplary embodiment an arrangement is provided for the partial release of a debug interface of a first programmable hardware component (1), specifically of a PLD (Programmable Logic Device), a processor or a combination of a PLD and a processor, with the first programmable hardware component, a configuration device and a configuration memory, whereby the first programmable hardware component features a configuration interface designed to program the first programmable hardware component, a data interface, and a debug interface which is designed to debug and program the first programmable hardware component. For this purpose, a first logic is provided in the configuration memory and the configuration device is designed to program the first programmable hardware component according to the first logic, i.e. to program the first programmable hardware component in such a way that it is designed to run the first logic via its programming or to process the data logically and arithmetically according to the specifications of the first logic. In accordance with an embodiment of the invention, the configuration can be further designed to register a programming process of the first programmable hardware component occurring via the debug interface according to a second logic, and to reprogram the first programmable hardware component according to the first logic upon termination of the programming process via the debug interface, i.e. to reverse the programming process occurring via the debug interface by programming the programmable hardware component according to the first logic.

The term PLD can be understood as a programmable logic circuit, for example, an FPGA (Field Programmable Gate Array) or a CPLD (Complex Programmable Logic Device).

The term logic can be understood as an abstract specification for the logical and arithmetic processing of data. After being programmed on the first programmable hardware component, a logic is located on the first programmable hardware component either in the form of a sequence of processor commands or in the form of a configuration of a programmable logic circuit, for example of an FPGA. In the configuration memory, the first logic can be provided in the form of an information which defines in an unambiguous manner a bit stream for programming the first programmable hardware component according to the first logic via the configuration interface.

The term termination of a programming process occurring via the debug interface can be understood as both a proper completion of the programming process after complete programming of the second first programmable hardware component and as an interruption of the programming process which prevents proper completion.

Some models of programmable hardware components do not feature a separate configuration interface because the manufacturer exclusively provides a configuration of the logic via the debug interface. In this case it is possible to provide a separate configuration interface and a separate debug interface by way of a circuit implemented outside the hardware component. For example, the debug interface can be linked to a circuit which is arranged to optionally connect the debug interface with a first external interface or with a second external interface, whereby the first external interface is designed to program the programmable hardware component and the second external interface is provided so the user can debug the programmed logic in the programmable hardware component, and whereby the circuit is arranged to connect the debug interface with the first external interface during a programming process of the hardware component and the debug interface with the second external interface when no programming process of the hardware component takes place. For the claimed invention it is insignificant whether a configuration interface and a debug interface are provided natively via the programmable hardware component as respectively separate interfaces or whether this occurs via a circuit arranged outside the hardware component.

One advantage of the arrangement according to the invention is that in addition to programming, a user can utilize the debug interface of the first programmable hardware component at their discretion, particularly for debugging the logic programmed on the first programmable hardware component, whereby damage to the first programmable hardware component or its hardware environment because of an inadmissible programming via the debug interface is precluded.

The reprogramming of the first programmable hardware component can occur automatically and the arrangement is designed in such a way that the first programmable hardware component is locked for use during the entire time from the registration of the programming process occurring via the debug interface to the completion of the reprogramming as per the first logic. Data exchange via the data interface is thus stopped during the named time frame.

In an embodiment, the first programmable hardware component features a configuration monitoring interface designed to signal a programming process of the first programmable hardware component, whereby the configuration device is designed to monitor the configuration monitoring interface and to register a programming process of the first programmable hardware component which occurs via the debug interface by way of the signal that is emitted through the configuration monitoring interface.

According to an embodiment, a configuration monitoring interface can be an interface of the first programmable hardware component via which the first programmable hardware component signals programming that is currently underway or the completion of programming, i.e. via which it can be read out whether programming of the first programmable hardware component is taking place at that time or has just taken place. Particularly many FPGAs feature a dedicated configuration monitoring interface. For example, FPGAs of the company Xilinx make a ConfDone signal available which is switched to logical 0 during ongoing programming of the FPGA and is switched to logical 1 upon completion of programming. However, it is also possible to design a pin or several pins of the FPGA, for example the data interface, as a configuration monitoring interface through the programming of the FPGA. If, for example, an FPGA is designed in such a way that it switches all pins of its data interface to logical 1 during a programming process, the FPGA can be programmed in such a way that at a specific pin of the data interface, a logical 0 is consistently emitted while running the FPGA, i.e., during the execution of the logic programmed on the FPGA. The respective pin would provide the same functionality as a dedicated configuration monitoring interface. A further possibility is to allow the FPGA to consistently emit a predetermined bit sequence at one or several pins of the data interface during runtime and to register a programming process by way of an interruption of the bit sequence.

According to an embodiment, each interface of the first programmable hardware component which emits a signal used by the configuration unit for the registration of a programming process of the first programmable hardware component is a configuration monitoring interface. For the object of the invention it is irrelevant whether the configuration monitoring interface is provided natively as a dedicated configuration monitoring interface by the first programmable hardware component or whether it is implemented afterwards via appropriate measures, particularly by way of the programming of the first programmable hardware component.

In an embodiment, the configuration device can be designed to interrupt, i.e. terminate, the programming process after registration of a programming process occurring via the debug interface, specifically by opening a switch controlled by the configuration device to interrupt the bit stream being received in the debug interface which defines the programming of the FPGA as per the second logic. This embodiment is advantageous because it ensures that the programming of the hardware component according to the second logic is not properly completed, i.e. the second logic is never completely programmed on the hardware component, and it is thus impossible that the hardware component start functioning with inadmissible programming and cause damage.

In an embodiment, the configuration device can be designed to arbitrarily reprogram or not reprogram the first programmable hardware component after terminating a programming process occurring via the debug interface as per the second logic. In this embodiment, the configuration device is thus fundamentally designed to perform a reprogramming of the first programmable hardware component in accordance with the invention, though not obligatorily but rather only under certain, predetermined conditions. In this embodiment, a license information can be stored in a memory of the configuration device which reads out the configuration device at registration via a programming process that occurs via the debug interface and which determines whether the configuration device reprograms the first programmable hardware component upon termination of the programming process, or not. The license information can, for example, be provided in the form of a license which would allow the programming of the first programmable hardware component, whereby a programming process performed via the debug interface would thus not be interrupted and not be reversed.

The configuration device can also be designed as a programmable hardware component, particularly as PLD, as processor or as a combination of a processor and a PLD. The debug interface can be designed, for example, as a JTAG interface, according to IEEE Standard 1149.1.

Furthermore, the arrangement can feature a second programmable hardware component, whereby a data connection is arranged between the second programmable hardware component and the data interface of the first programmable hardware component, whereby particularly on the second programmable hardware component a logic is also programmable and the first and second programmable hardware components are arranged in order to process the logics programmed thereupon in a parallel manner, and to exchange data during processing via the data connection between the programmed logics on the first and the second programmable hardware components. In other words, the first programmable hardware component and the second programmable hardware component can be configured to process a program in a parallel manner and to exchange program data via the data connection during program processing.

The first programmable hardware component can be designed as an FPGA and the second programmable hardware component can be designed as an FPGA or as a processor.

In an embodiment, the second programmable hardware component can be designed to program the first programmable hardware component via the configuration device. In one possible embodiment, the second programmable hardware component is designed to read out the first logic from the configuration memory and to transmit it to the configuration device, and the configuration device is designed to receive the first logic from the second programmable hardware component and to program the first programmable hardware component in accordance with the first logic. In a further, possible embodiment, the second programmable hardware component is designed to transmit a configuration signal to the configuration device and the configuration device is designed to register the configuration signal and, resulting from the registration of the configuration signal, to read out the first logic from the configuration memory and program the first programmable hardware component according to the first logic.

The first logic can be at least partially designed by a user and stored in the configuration memory. In an embodiment of the invention, particularly, the first logic can be either an overwrite logic which is not changeable by the user or the first logic can be composed of two partial logics, whereby the first, partial logic is a functional logic which is freely programmable by a user and the second, partial logic is an obligatory interface logic which is not freely programmable by a user. The interface logic provides mechanisms for the data exchange between the functional logic and the pins of the data interface of the first programmable hardware component and also provides the functionality of a safety logic, i.e. it features safety mechanisms to prevent hardware damage due to faulty programming of the functional logic. A data exchange between the functional logic and the data interface is only possible with communication via the interface logic.

An overwrite logic can be a predetermined logic not changeable by the user which is intended specifically for reprogramming the first programmable hardware component after registering a program process of the first programmable hardware component that occurred via a debug interface. In one embodiment of the invention, the first logic is provided in the form of an overwrite logic until a user stores a first logic, designed by said user, in the configuration memory.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the sole FIGURE illustrates a schematic drawing of an arrangement according to an embodiment of the invention.

DETAILED DESCRIPTION

The drawing of FIG. 1 shows an exemplary arrangement according to the invention with a first programmable hardware component 1 designed as an FPGA, hereafter referred to as FPGA, and a second programmable hardware component 2 designed as a processor, hereafter referred to as processor. The FPGA 1 features a data interface 7 for the exchange of data between a logic 13 programmed on the FPGA 1 and hardware provided outside of the FPGA, and the data interface 7 features a plurality of pins, whereby each pin is designed as a data input and/or data output. A first data connection 18 is provided between the data interface 7 and the processor 2. A configuration memory 14 configured as flash memory is designed to be written by a user with a first logic 13 for the FPGA 1, and a configuration unit 6 designed as a CPLD (complex programmable logic device), hereafter referred to as CPLD, is configured to program the FPGA 1 via a second data connection 26 in accordance with the first logic 13. The second data connection 26 is arranged between the CPLD 6 and a configuration interface 5 of the FPGA 1 is configured as dedicated configuration interface. The processor 2 is configured to read out the first logic 13 from the configuration memory 14 via a third data connection 24 and to transmit it to the CPLD 6 via a fourth data connection 16. On the CPLD 6, a persistent configuration logic 28 not accessible to the user is provided and the CPLD 6 is configured by way of the configuration logic 28 to receive the second logic 13 from the processor 2 and to program the FPGA 1 according to the first logic 13.

In an application of the illustrated arrangement, the processor 2 and the FPGA 1 are provided in order to process together a control program for a mechatronic process in hard real-time, whereby the arrangement is programmed by a user with the control program, and whereby selected routines of the control program, especially particularly time critical routines, are pageable by the user to the FPGA 1. The illustrated arrangement is programmed via a special software tool and the software tool is configured to program the processor 2 and to store the first logic 13 in the flash-memory 14. The software tool thereby ensures that the first logic is composed of two partial logics: an obligatory interface logic 4 and a functional logic 11. The functional logic 11 is freely programmable by the user and includes the routines of the control program which are to be pageable to the FPGA. The interface logic 4 is not freely programmable by the user and supplies mechanisms for data exchange between the functional logic 11 and the data interface 7. The interface logic 4 also contains safety mechanisms to prevent damage to the FPGA 1 or to other hardware components located outside the FPGA 1 resulting from faulty programming of the functional logic 11. The software tool ensures that the data exchange between the functional logic 11 and the data interface 7 occurs exclusively by way of the mechanisms provided by the interface logic 4. During programming of the FPGA according to the first logic 13, the CPLD 6 sets up a fifth data connection 12 for the data exchange between the functional logic 11 and the interface logic 4.

The FPGA 1 features a debug interface 8 designed as a JTAG interface. The debug interface 8 is accessible to the user via a JTAG connector 10 and connected to the JTAG connector via a sixth data connection 22. The sixth data connection is interruptable by opening a switch 32, whereby the switch 32 is closed in its normal state. The arrangement is configured to prevent programming of the FPGA via the debug interface 8 according to the second logic. The reason is that the FPGA 1 would be programmable without the use of the software tool by way of the debug interface 8 if it were enabled without restriction. In such a case, the second logic would be completely, freely programmable by the user and would generally not contain any safety mechanisms such as the ones stored in the interface logic 4.

The FPGA 1 features a configuration monitoring interface 9 and signals via the configuration monitoring interface 9 whether the FPGA 1 is currently being programmed or not programmed, or has not been programmed. For example, the configuration monitoring interface 9 can be configured as a ConfDone interface, and the FPGA 1 provides a logical 0 and a logical 1 at the configuration monitoring interface 9 during the running programming process of the FPGA 1, when at least one programming process of the FPGA 1 has been completed since the last startup of the arrangement, independent of whether the current programming process occurs via the configuration interface 5 or via the debug interface 8.

The CPLD 6 is configured to read out the configuration monitoring interface 9 via a seventh data connection 20. In the CPLD 6, an information 30 by way of which it is determined whether a programming of the FPGA 1 is admissible or not, is stored, and the CPLD 6 is configured by way of the configuration logic 28 to read out the binary information 30 and to reprogram the FPGA 1 upon completion of the programming process if the value 0 is stored in the binary information 30. The CPLD 6 is also configured to not reprogram the FPGA 1 if the value 1 is stored in the binary information 30, whereby the binary information 30 is initially, i.e. after startup of the arrangement, set to the value 0.

According to the invention, the CPLD 6 programs the FPGA 1 according to the first logic 13 and the arrangement is configured to process the programming of the FPGA 1 according to the first logic 13, as follows: The processor 2 sets the binary information 30 to the value 1 and via a signal conveys to the CPLD 6 the desire to program the FPGA 1. The processor reads out the first logic 13 stored in the configuration memory 14 and transmits the first logic 13 via a fourth data connection 16 to the CPLD 6. The CPLD 6 programs the FPGA 1 via a second data connection 26 according to the first logic 13, i.e. it arranges on the FPGA 1 a logical switch which corresponds to the first logic 13. The FPGA 1 signals the programming process via the configuration monitoring interface 9. The CPLD 6 registers the signaling of the programming process via the FPGA 1. However, because the binary information 30 is set to the value 1, the CPLD 6 does not perform a reprogramming of the FPGA as a result of the signaling of the programming process. Upon termination of the programming process, the CPLD 6 conveys the termination of the programming process to the processor 2 and the processor 2 sets the binary information 30 back to value 0.

In the case of an attempted programming of the FPGA 1 via a debug interface 8 per a second logic, the arrangement is configured to run through the following steps: Via the configuration monitoring interface 9, the FPGA 1 signals the programming process occurring via the debug interface 8. The CPLD 20 registers the programming process via the seventh data connection 20 and verifies the binary information 30. If the value 1 is stored in the binary information 30, the CPLD 6 undergoes no further steps and the programming process resulting via the debug interface 8 according to the second logic can be properly completed. If the value 0 is stored in the binary information, the CPLD 6 opens the switch 32 via an eighth data connection 31 and thereby terminates the programming. In this way, the programming process is prevented from completing according to the second logic and the FPGA 1 begins to process the second logic. The CPLD 6 further transmits to the processor 2 the desire to reprogram the FPGA 1 over a signal transmitted via the fourth data connection 16. The processor 2 registers the desire for reprogramming of the FPGA and performs the reprogramming by processing a programming of the FPGA according to the first logic 13 stored in the configuration memory 14 following the described steps. Upon completion of the reprogramming, the CPLD 6 re-closes the switch 32 and the processor 2 notifies the user via a monitor output that the attempted programming of the FPGA via the debug interface 8 has been stopped and reversed.

In an embodiment of the invention, the first logic 13 is at least partially programmed by the user. In another embodiment, the first logic is a predetermined logic that cannot be influenced by the user. In yet another embodiment, the first logic is initially a predetermined logic that cannot be influenced by the user, which is then at least partially replaced by a first logic programmed by the user as soon as the user has stored their own at least partially self-programmed logic in the configuration memory 14.

In an embodiment of the invention, the reprogramming of the FPGA can be deactivated upon registering a programming process performed via a debug interface 8 as well as upon interruption of the programming process through opening of the switch 32. For this purpose, in one embodiment the binary information 30 can be permanently set to the value 1 by having the processor 2 deactivate the setting of the binary information 30. Upon registering a programming process performed via the debug interface, in another embodiment the CPLD 6 first verifies a license information stored on the CPLD 30, then does not perform any further steps if the license information is set to the value 1, and verifies the binary information 30 only if the license information is set to the value 0.

The configuration unit 6 does not have to be designed as a dedicated and separate configuration unit, but can also, for example, be integrated in the second programmable hardware component 2. It is further understood that the interruption of the programming process according to the second logic does not have to occur through the interruption of the bit stream by opening switch 32, but that, for example, this can also occur by resetting the first programmable hardware component. It is further understood that the configuration unit 6 can also read out the first logic directly from the configuration memory 14, i.e. without intervention by the second programmable hardware component 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An arrangement for partial release of a debug interface of a first programmable hardware component, the arrangement comprising:

a first programmable hardware component comprising a configuration interface adapted to program the first programmable hardware component, a data interface and a debug interface that debugs and programs the first programmable hardware component;

a configuration device; and a configuration memory having therein a first logic stored, the configuration device being configured to program the first programmable hardware component with the first logic, wherein the configuration device registers a programming process of the first programmable hardware component occurring via the debug interface according to a second logic and reprograms the first programmable hardware component with the first logic upon termination of the programming process occurring via the debug interface.

2. The arrangement according to claim 1, wherein the reprogramming of the first programmable hardware component occurs automatically and the first programmable hardware component is locked for use during the entire time from registration of the programming process occurring via the debug interface up to completion of the reprogramming with the first logic.

3. The arrangement according to claim 1, wherein the first programmable hardware component features a configuration monitoring interface that signals a programming process of the first programmable hardware component and the configuration device monitors the configuration monitoring interface.

4. The arrangement according to claim 3, wherein the configuration device is designed to stop the programming process occurring via the debug interface upon registration of the programming process occurring via the debug interface, specifically to interrupt the bit stream entering the debug interface by opening a switch.

5. The arrangement according to claim 1, wherein the configuration device is a CPLD, an FPGA, a processor, or a combination of each.

6. The arrangement according to claim 1, wherein the debug interface is a JTAG interface according to IEEE Standard 1149.1.

7. The arrangement according to claim 1, wherein the arrangement further comprises a second programmable hardware component and a data connection that is arranged between the data interface and the second programmable hardware component, and wherein the first programmable hardware component and the second programmable hardware component process a program in a parallel manner and exchange program data via the data connection during program processing.

8. The arrangement according to claim 7, wherein the second programmable hardware component programs the first programmable hardware component.

9. The arrangement according to claim 7, wherein the first programmable hardware component is an FPGA and the second programmable hardware component is a processor or an FPGA.

10. The arrangement according to claim 1, wherein the first logic is at least partially designed by a user and is storeable in the configuration memory.

11. The arrangement according to claim 10, wherein the first logic is an overwrite logic that cannot be changed by the user or wherein the first logic is composed of a functional logic that is freely configured by a user and an obligatory interface logic for data exchange between the functional logic and the data interface.

12. The arrangement according to claim 1, wherein the first programmable hardware component is a PLD, a processor or a combination of a PLD and a processor.

13. The arrangement according to claim 1, wherein the configuration device initiates the termination of the programming process, the programming process occurring over the debug interface.

14. The arrangement according to claim 1, wherein the programming process is an encoding process of the second logic onto the first programmable hardware component.

15. The arrangement according to claim 1, wherein the second logic is code being installed to replace the first logic.

16. The arrangement according to claim 1, wherein reprogramming of the first programmable hardware component is automatically initiated upon termination.

17. An arrangement for partial release of a debug interface of a first programmable hardware component, the arrangement comprising:
a first programmable hardware component comprising a configuration interface adapted to program the first programmable hardware component, a data interface and a debug interface that debugs and programs the first programmable hardware component;
a configuration device; and
a configuration memory having therein a first logic stored, the configuration device being configured to program the first programmable hardware component according to the first logic,
wherein the configuration device registers a programming process of the first programmable hardware component occurring via the debug interface according to a second logic and reprograms the first programmable hardware component according to the first logic upon termination of the programming process occurring via the debug interface,
wherein the configuration device arbitrarily performs or does not perform a reprogramming of the first programmable hardware component upon termination of a programming process occurring via the debug interface according to the second logic.

18. The arrangement according to claim 17, wherein, in a memory of the configuration device, an information is stored which determines whether upon termination of the programming process according to the second logic the configuration device reprograms or does not reprogram the first programmable hardware component.

* * * * *